(12) United States Patent
Ohgushi et al.

(10) Patent No.: US 10,207,659 B2
(45) Date of Patent: Feb. 19, 2019

(54) FLEX-RESISTANT SHIELDED COMPOSITE CABLE AND WIRE HARNESS

(71) Applicant: YAZAKI CORPORATION, Tokyo (JP)

(72) Inventors: Kazuhiro Ohgushi, Shizuoka (JP); Satoru Yoshinaga, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/615,320

(22) Filed: Jun. 6, 2017

(65) Prior Publication Data

US 2017/0361789 A1 Dec. 21, 2017

(30) Foreign Application Priority Data

Jun. 21, 2016 (JP) ................................. 2016-122367

(51) Int. Cl.
*H01B 7/00* (2006.01)
*B60R 16/02* (2006.01)
(Continued)

(52) U.S. Cl.
CPC ........... *B60R 16/0215* (2013.01); *H01B 7/04* (2013.01); *H01B 7/17* (2013.01); *B60R 16/0207* (2013.01);
(Continued)

(58) Field of Classification Search
CPC .......... H01B 7/04; H01B 7/17; H01B 7/0045; H01B 7/182; H01B 7/228; B60R 16/0215; B60R 16/0207
(Continued)

(56) References Cited

U.S. PATENT DOCUMENTS 4,822,950 A * 4/1989 Schmitt ............... H01B 11/1813
174/109
5,103,067 A * 4/1992 Aldissi ............... H01B 11/1033
174/107
(Continued)

FOREIGN PATENT DOCUMENTS

CN 103370750 A 10/2013
CN 203387021 U 1/2014
(Continued)

OTHER PUBLICATIONS

Chinese Office Action for the related Chinese Patent Application No. 201710475373.8 dated Aug. 30, 2018.
(Continued)

*Primary Examiner* — William H Mayo, III
(74) *Attorney, Agent, or Firm* — Kenealy Vaidya LLP

(57) ABSTRACT

A flex-resistant shielded composite cable includes a plurality of electric wires, a shielding layer and a tubular sheath. Each of the electric wires includes a conductor part which is composed of a twisted wire, which is formed by twisting a plurality of strands having a diameter of 0.05 mm or more and 0.12 mm or less, a nominal sectional area of the conductor being 8 sq or more, a covering part covering the conductor part. The shielding layer is formed of a braid formed by braiding plated fiber formed by performing metal-plating on anti-tension fiber and covers outer periphery of the plurality of electric wires. The tubular sheath is provided on the outer periphery of the shielding layer and made of an insulating resin.

5 Claims, 5 Drawing Sheets

(51) Int. Cl.
  *H01B 7/17* (2006.01)
  *H01B 7/04* (2006.01)
  *H01B 7/18* (2006.01)
  *H01B 7/22* (2006.01)
(52) U.S. Cl.
  CPC ............ *H01B 7/0045* (2013.01); *H01B 7/182* (2013.01); *H01B 7/228* (2013.01)
(58) Field of Classification Search
  USPC .................. 174/28, 29, 110 R, 113 R, 120 R
  See application file for complete search history.

(56) References Cited

U.S. PATENT DOCUMENTS

| | | | | |
|---|---|---|---|---|
| 5,171,938 | A * | 12/1992 | Katsumata | H01B 7/08 174/105 SC |
| 5,475,185 | A * | 12/1995 | Tokarsky | H01B 11/1813 174/107 |
| 5,486,649 | A * | 1/1996 | Gareis | H01B 11/1016 174/10 |
| 5,956,445 | A * | 9/1999 | Deitz, Sr. | G02B 6/441 174/24 |
| 6,271,466 | B1 * | 8/2001 | Tsuneoka | H01B 7/0009 174/102 R |
| 7,827,678 | B2 * | 11/2010 | Dion | H01B 13/262 156/54 |
| 2013/0032393 | A1 * | 2/2013 | Toyama | B60R 16/0215 174/72 A |
| 2013/0277087 | A1 | 10/2013 | Hayakawa et al. | |
| 2013/0333938 | A1 * | 12/2013 | Kondo | H01B 7/04 174/393 |
| 2014/0190741 | A1 | 7/2014 | Hayakawa | |
| 2015/0165987 | A1 | 6/2015 | Hayakawa et al. | |
| 2015/0165988 | A1 | 6/2015 | Hayakawa et al. | |
| 2015/0194796 | A1 | 7/2015 | Sugimoto | |
| 2016/0068119 | A1 | 3/2016 | Hayakawa | |
| 2016/0339854 | A1 | 11/2016 | Hayakawa et al. | |
| 2018/0134239 | A1 | 5/2018 | Hayakawa et al. | |

FOREIGN PATENT DOCUMENTS

| | | |
|---|---|---|
| CN | 203673848 U | 6/2014 |
| CN | 104584350 A | 4/2015 |
| JP | 10-134641 A | 5/1998 |
| JP | 2001-312926 A | 11/2001 |
| JP | 2012-174336 A | 9/2012 |
| JP | 2013-237428 A | 11/2013 |
| JP | 2014-135153 A | 7/2014 |

OTHER PUBLICATIONS

Japanese Office Action for the related Japanese Patent Application No. 2016-122367 dated Aug. 21, 2018.
Japanese Office Action for the related Japanese Patent Application No. 2016-122367 dated Nov. 20, 2018.

* cited by examiner

FLEX-RESISTANT SHIELDED COMPOSITE CABLE AND WIRE HARNESS

CROSS REFERENCE TO RELATED APPLICATION

This application is based on Japanese Patent Application No. 2016-122367 filed on Jun. 21, 2016, the contents of which are incorporated herein by reference.

BACKGROUND

1. Technical Field

The present invention relates to a flex-resistant shielded composite cable and a wire harness for a wheel.

2. Background Art

Traditionally, a composite cable having a plurality of electric wires inside a sheath has been proposed. For example, one end of such a composite cable is connected to a battery and the other end is connected to an electric brake provided at the wheel side. Since this composite cable is flexed with the movement of the wheel to the left or right according to a handle operation, it is preferable that the composite cable has high flexing durability.

It is proposed that a composite cable having flex resistance includes a lubricant for reducing frictional resistance between a plurality of electric wires and a sheath covering the plurality of electric wires, and the conductor parts of the plurality of electric wires are twisted wire made of a plurality of strands having a diameter of 0.05 mm or more and 0.12 mm or less (for example, refer to JP-A-2014-135153).

This composite cable improves the flex resistance since the conductor part has strength and flexibility by improving slippage by the lubricant, and by making the wire diameter within the above range.

A signal line may be further added into the sheath of the flex-resistant composite cable described in JP-A-2014-135153. In this case, for example, the plurality of electric wires are connected to the electric brake, and, for example, a signal line is connected to a wheel speed sensor. In such a configuration, when the vehicle is traveling, a signal from the wheel speed sensor is transmitted to the vehicle side, and when the vehicle stops, the signal from the wheel speed sensor becomes unnecessary, and power from the vehicle side through the plurality of electric wires is supplied to make the electric brake operate. Thus, the use timings of the plurality of electric wires and the signal line are divided when the vehicle is traveling and when the vehicle is stopped.

In recent years, an in-wheel motor structure having a three-phase drive motor for rotating a wheel is provided on the wheel has been proposed. In such a structure, an inverter for driving the three-phase drive motor is provided at the vehicle side, and a plurality (three) electric wires are connected to the three-phase drive motor at the wheel side from the inverter. Since electric power is supplied from the battery to the drive motor via the inverter both when the vehicle is running and when the vehicle stops, to prevent noise interference with other wires, the electric wires for driving the motor should be shielded.

Shielding performance may be required for a flex-resistant composite cable having a plurality of electric wires housed in a sheath not only in the above case, but even when used in other places or applications.

The present invention is made to solve the traditional problem, and an object of the present invention is to provide a flex-resistant shielded composite cable having a plurality of electric wires housed in a sheath and having flex resistance and shielding performance and a wheel wiring wire harness.

SUMMARY (1) According to an aspect of the invention, a flex-resistant shielded composite cable includes a plurality of electric wires, a shielding layer and a tubular sheath. Each of the electric wires includes a conductor part which is composed of a twisted wire, which is formed by twisting a plurality of strands having a diameter of 0.05 mm or more and 0.12 mm or less, a nominal sectional area of the conductor being 8 sq or more, a covering part covering the conductor part. The shielding layer is formed of a braid formed by braiding plated fiber formed by performing metal-plating on anti-tension fiber and covers outer periphery of the plurality of electric wires. The tubular sheath is provided on the outer periphery of the shielding layer and made of an insulating resin.

Thus, according to the flex-resistant shielded composite cable (1), since the strand diameter of the conductor parts is set to 0.05 mm or more, the strands do not become excessively thin and is difficult to be easily disconnected, and since the strand diameter of the conductor parts is set to 0.12 mm or less, the strand has a preferable flexibility. Since the conductor parts have a nominal cross sectional area of 8 sq or more, the shielding layer on the outer peripheral side is made to be somewhat larger. Further, since the shielding layer is composed of a braiding formed by braiding plated fiber which are formed by performing metal-plating on anti-tension fiber, the shielding layer has a higher strength and a wider elastic region and has appropriate flex resistance, and the shielding performance can also be secured by metal plating. As described above, it is possible to provide the flex-resistant shielded composite cable having the plurality of electric wires housed in the sheath and having flex resistance and shielding performance.

(2) in the flex-resistant shielded composite cable (1), the plurality of electric wires are three or more electric wires and twisted.

According to this flex-resistant shielded composite cable (2), if the three or more electric wires are not twisted, when the three or more electric wires are connected to a movable part, the length of the electric wire located at the center side becomes shorter among the three or more electric wires, and the pulling tension by driving acts more on the electric wire located at the center side than the electric wires at the end side excluding the center side. As a result, the possibility of disconnection increases, but by twisting process to make the pulling tension uniform, even if the electric wires are connected to the movable part, it is possible to prevent the situation that only a part of the electric wire is easily disconnected.

(3) In the flex-resistant shielded composite cable (2), the three or more electric wires are twisted at a twist pitch of 18 times or less a layer core diameter which is the diameter of a circle passing the centers of the three or more electric wires.

According to this flex-resistant shielded composite cable (3), since the three or more electric wires are twisted at a twist pitch of 18 times or less the layer core diameter, the relationship of the electric wire length increment by the twisting process with the electric wire bundle length decrement in the case the twisted electric wires are most twisted, (when the twisting operation is performed at the largest angle) is optimized, so that it is possible to further prevent the situation that only a part of the electric wires are easily disconnected.

(4) According to another aspect of the invention, a wire harness includes the flex-resistant shielded composite cable according to any one of (1) to (3). One end of the wire harness is connected to a motor for driving wheels provided at a wheel side. The wire harness further includes a second electric wire disposed along the flex-resistant shielded composite cable between the shielding layer of the flex-resistant shielded composite cable and the tubular sheath or outside the tubular sheath.

According to this wheel wiring wire harness (4), since the flex-resistant shielded. composite cable and the another electric wire arranged along the flex-resistant shielded composite cable are included, it is possible to suppress noise interference to other electric wires, for example, when the motor for driving wheels is driven by electric power from the inverter.

(5) In the wire harness (4), the second electric wire is arranged between the shielding layer and the tubular sheath in a spiral shape in a longitudinal direction of the flex-resistant shielded composite cable.

According to this wheel wiring wire harness (5), since the another electric wire is spirally arranged between the shielding layer and the sheath in the longitudinal direction of the flex-resistant shielded composite cable, the difference in line length occurring inside and outside the flexing when the cable is flexed can be absorbed, and thus it is possible to eliminate a concern that disconnection of the another electric wire occurs earlier than the plurality of electric wires.

According to the present invention, it is possible to provide a flex-resistant shielded composite cable having a plurality of electric wires housed in a sheath and having flex resistance and shielding effect, and a wheel wiring wire harness.

DETAILED DESCRIPTION OF EMBODIMENT

Hereinafter, the present invention will be described in accordance with preferred embodiments. It should be noted that the present invention is not limited to the embodiments described below and can be appropriately changed without departing from the gist of the present invention. In addition, in the embodiments described below, the illustration and description of a part of the configuration are omitted, but it is needless to say that appropriate known or well-known techniques are applied to details of the omitted technique within the scope not inconsistent with the contents described below.

Figure 1:
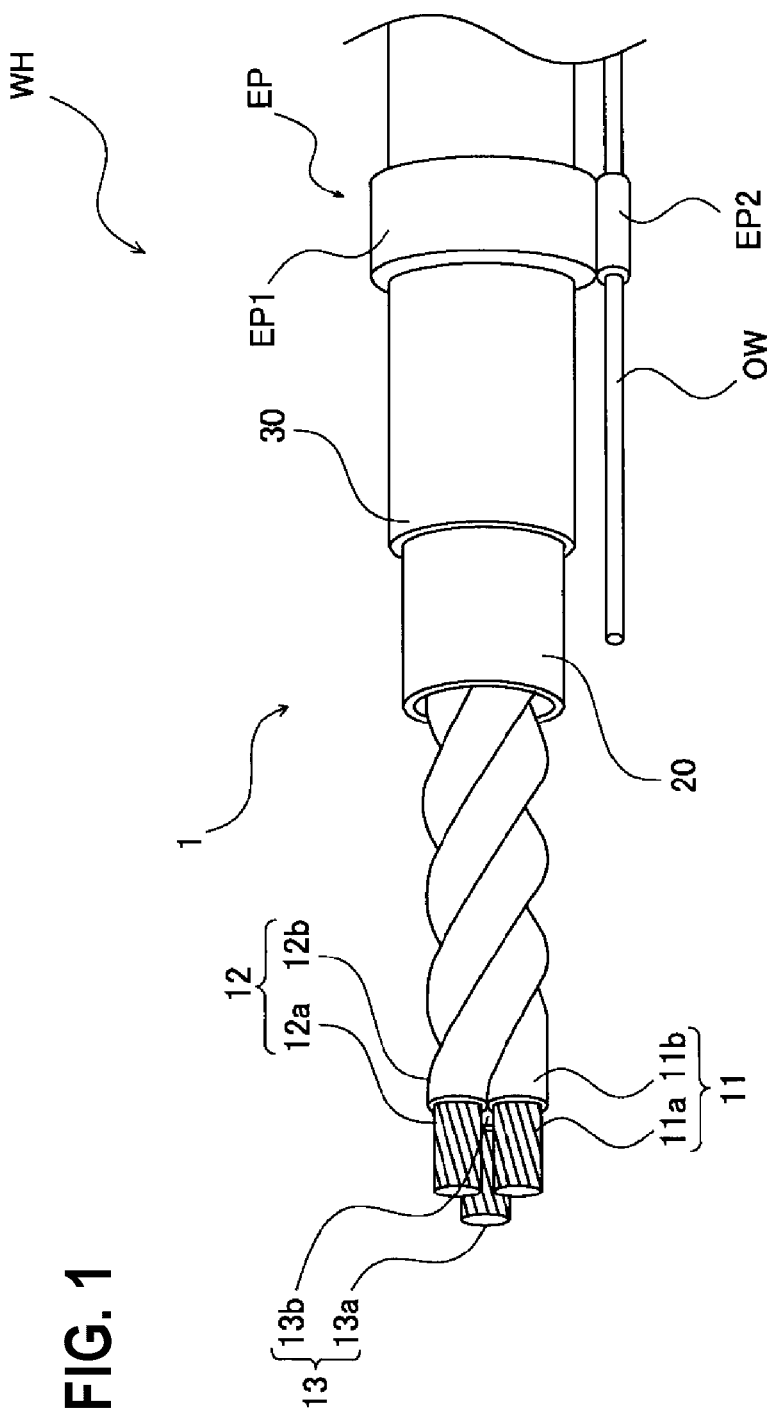
FIG. 1 shows a wheel wiring wire harness including a flex-resistant shielded composite cable according to a first embodiment of the present invention.

FIG. 1 shows a Wheel wiring wire harness including a flex-resistant shielded composite cable according to a first embodiment of the present invention. As shown in FIG. 1, a wheel wiring wire harness WH includes a flex-resistant shielded composite cable 1, another electric wire OW, and an exterior component EP.

One end of the flex-resistant shielded composite cable 1 is connected to a three-phase drive motor (not shown) for driving a wheel which is provided at the wheel side, the other end is connected to an inverter for driving the three-phase drive motor. For example, one end of the another electric wire OW is connected to a wheel speed sensor which is provided at the wheel side and outputs a signal corresponding to the rotation of the wheel, and the other end is connected to a calculation part at the vehicle side.

The exterior part EP has a structure to connect a first cylinder part EP1 and a second cylinder part EP2 so that the cylinder axes are parallel to each other. The flex-resistant shielded composite cable 1 is inserted through the first cylindrical pail EP1 and the another electric wire OW is inserted through the second cylindrical part EP2. Although only one exterior component EP is shown in FIG. 1, a plurality of exterior components EP are arranged at predetermined intervals in the longitudinal direction of the wheel wiring wire harness WH.

With such an exterior part EP, the another electric wire OW is arranged along the flex-resistant shielded composite cable 1 outside the flex-resistant shielded composite cable 1. Further, since the one end of the flex-resistant shielded composite cable 1 is attached to the vehicle side, the flex-resistant shielded composite cable is flexed with the movement of the wheel to the left and right according to a handle operation.

The flex-resistant shielded composite cable 1 includes a plurality (three) of electric wires 11 to 13, a shielding layer 20 covering the outer peripheries of the plurality of electric wires 11 to 13, and a tubular sheath 30 which is provided on the outer periphery of the shielding layer 20 and made of insulating resin.

Each of the plurality of electric wires 11 to 13 is composed of conductor parts 11a to 13a and covering parts 11b to 13b. The conductor parts 11a to 13a are composed of a stranded wire formed by twisting a plurality of metal strands made of copper, aluminum, alloy of copper, aluminum, or the like. The conductor parts 11a to 13a have a nominal sectional area of 8 sq or more. The sectional area is suitable for supplying electric power to the motor for driving the wheel via the inverter.

Here, the diameter of each of the plurality of metal strands is 0.05 mm or more and 0.12 mm or less. Since the strand diameter is 0.05 mm or more, the strand will not become excessively thin, and it is possible to reduce the possibility of disconnection due to flexing with the movement of the wheel to the left and right. In addition, since the strand diameter is 0.12 mm or less, flexibility can be ensured (distortion due to flexing can be reduced) and the possibility of disconnection due to flexing with the movement of the wheel to the left and right can be reduced. In other words, the plurality of electric wires 11 to 13 have a structure that excels in flexing property because the diameter of the metal strand falls within the above range.

The shielding layer 20 is composed of a braiding formed by braiding plated fiber which is formed by performing metal-plating on anti-tension fiber. Here, the anti-tension fiber is chemically synthesized from raw material such as petroleum to prepare a fibrous material, and the pulling strength at break is 1 GPa or more and the elongation rate at break is 1% or more and 10% or less. Examples of such fiber include aramid fiber, polyarylate fiber, and PBO fiber. The metal plating is made of metal such as copper or tin, and preferably copper is adopted. For the braiding used in the shielding layer 20, by adjusting the holding number, the striking number, the diameter of the plated fiber, etc., the roughness of eyes is adjusted (the density of the wires is adjusted), and the braiding resistance is 10.00 mΩ/m or less. More preferably, the braiding resistance is not more than 7.50 mΩ/m.

Further, in the present embodiment, the plurality of electric wires 11 to 13 which are twisted are adopted. In a cross section, the twist pitch of the twisting is not more than 18 times a layer core diameter which is the diameter of a circle passing the centers of the plurality of electric wires 11 to 13.

Next, the flex resistances of a wire (embodiment 1) used for the shielding layer 20 used for the flex-resistant shielded composite cable according to this embodiment and wires used for a shielding layer (comparative examples 1 and 2) to be compared are described.

First, in the embodiment 1, a plated fiber having a diameter of 0.028 mm is used. The plated fiber is made by copper plating polyarylate fiber by a thickness of 0.003 mm. The polyarylate fiber is used as the anti-tension fiber.

In the comparative example 1, a tin-plated annealed copper wire having a diameter of 0.12 mm which is formed by tin plating an annealed copper wire by a thickness of 0.1 μm is used. In the comparative example 2, a copper foil thread having a diameter of 0.25 mm is used which is formed by winding a tin-plated copper foil, which has a copper part of a thickness of 30 μm and a tin-plated part of a thickness of 0.1 μm, into a spiral shape on 46 Tetoron (registered trademark) fibers so that the copper foil existence rate is 75% or more relative to the outer periphery of the fiber bundle in the section.

Figure 2:
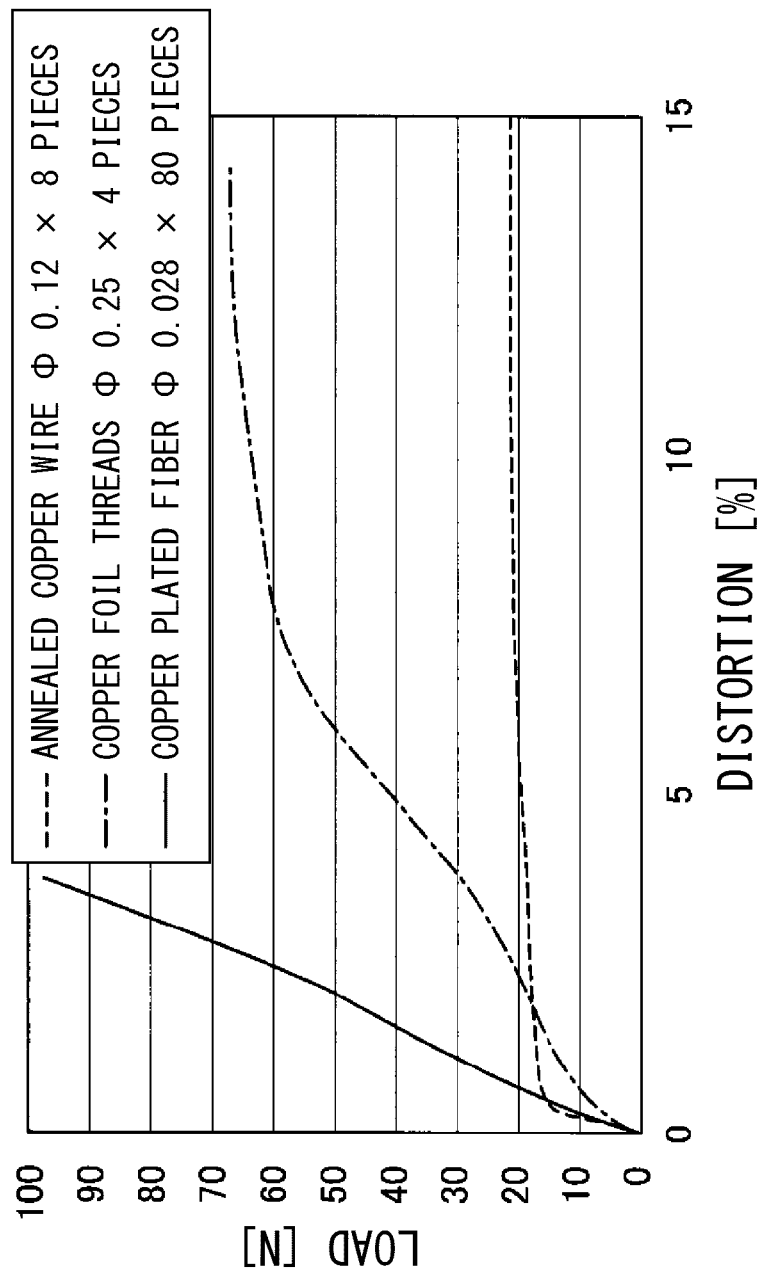
FIG. 2 is a graph showing the correlations between the distortions (elongations) and the strengths of wires that form braid.

FIG. 2 is a graph showing the correlations between the distortions (elongation) and the strengths of the wires of the embodiment and the comparative examples forming the braidings. In FIG. 2, data obtained by a pulling test described in item 5 of JIS_C 3002 with a testing machine specified in JIS_B 7721 is shown.

As shown in FIG. 2, for the plated fiber (80 bundles) according to the embodiment 1, the increase in strength (load) is proportional to the increase in distortion in a region up to a distortion of 3.5%. That is, the elastic region is up to a distortion of 3.5% (strength 97 N). However, when the distortion exceeds 3.5% (strength 97 N), the plated fiber breaks.

For eight tin-plated annealed copper wires (eight bundles) according to the comparative example 1, the increase in strength is proportional to the increase in distortion in a region up to a distortion of 0.5%. That is, the elastic region is up to a distortion of 0.5% (strength 15 N), in addition, when the distortion exceeds 0.5%, the strength slightly increases with increasing distortion, and the strength is about 20 N at a distortion of 5%. Further, as shown in FIG. 2, for the tin-plated annealed copper wire according to the comparative example 1, the strength does not reach 30 N even when the distortion becomes 15%.

For the copper foil thread (four bundles) according to the comparative example 2, the increase in strength (load) is proportional to the increase in distortion in the region up to a break of up to 7% distortion. That is, the elastic region is up to a distortion of 7% (strength 55 N). In addition, when the distortion exceeds 7%, the strength gradually increases against the increase in distortion, the strength is about 64 N at a distortion of 10%, and a break occurs at a distortion of 14.3% (hardness 68 N).

From these results, the strength increases in the order of tin-plated annealed copper wire, copper foil thread, and plated fiber, and the elastic region widens in the order of tin-plated annealed copper wire, plated fiber, and copper foil thread.

Figure 3:
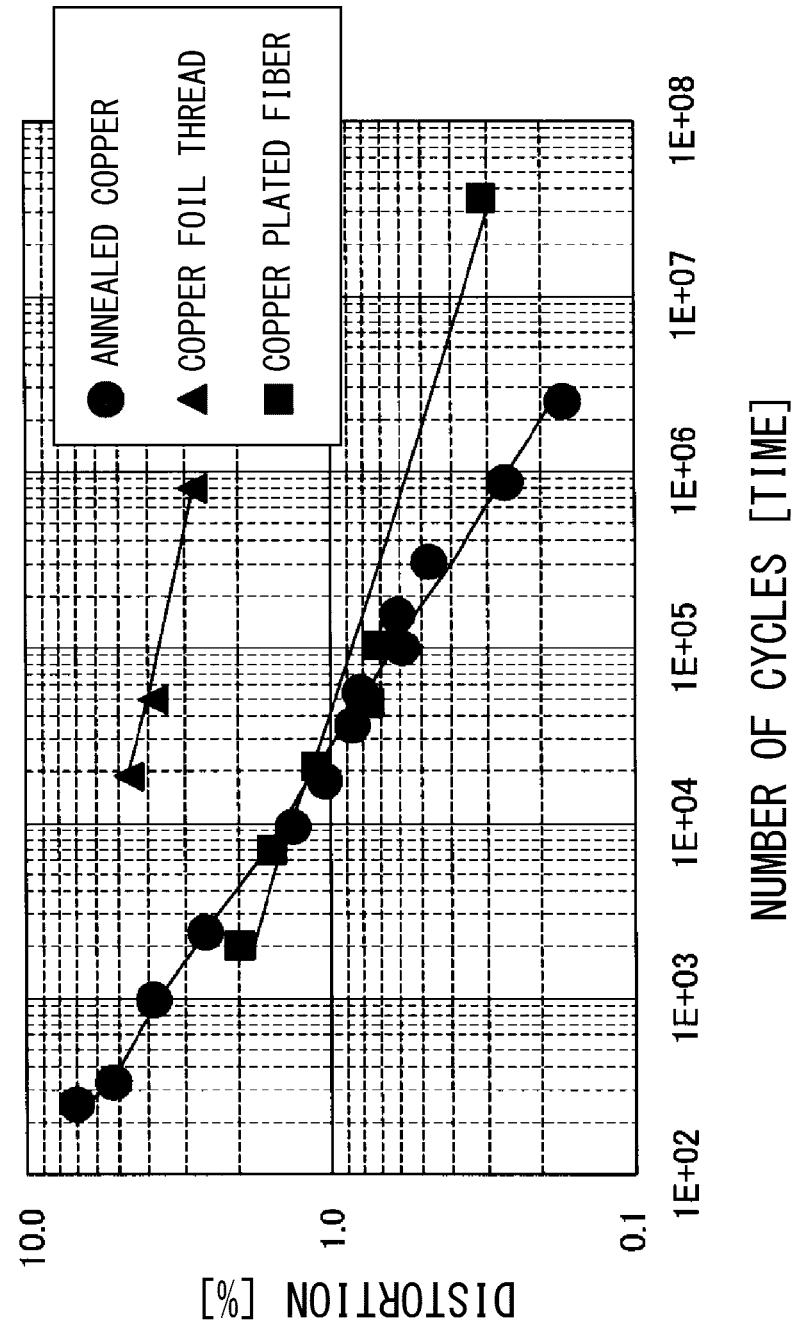
FIG. 3 is a graph showing distortion and the number of cycles until fatigue failure.

FIG. 3 is a graph showing distortion and the number of cycles until fatigue failure. In FIG. 3, with the testing machine repeatedly performing a series of operations of applying a predetermined pulling load to the test specimen and releasing the load, the distortion at the time of applying the pulling load to the initial length of the specimen, and the number of times the pulling load is given at the time of 10% increase from the specimen's initial resistance value as the number of cycles are plotted.

As shown in FIG. 3, for the plated fiber (φ 0.028×80 pieces) according to the embodiment 1, the number of cycles until fatigue failure is about 2,000 at a distortion of 2.0%, about 5000 at a distortion of 1.7%, about 20000 at a distortion of 1.1%, and about 35 million at a distortion of 0.35%.

For the tin-plated annealed copper wire (φ 0.12×8 pieces) shown in the comparative example 1, the number of cycles until fatigue failure is about 150 at a distortion of 7.0%, about 1000 at a distortion of 4.0%, about 18000 at a distortion of 1.0%, about 100,000 at a distortion of 0.6%, and about 2.5 million at a distortion of 0.18%.

For the copper foil threads (φ 0.25×4 pieces) shown in the comparative example 2, the number of cycles until fatigue failure is about 19,000 at a distortion of 4.7%, about 50,000 at a distortion of 4.0%, and about 700,000 at a distortion of 3.0%.

From the result shown in FIG. 3, the single copper foil thread has a high number of cycles even for large distortion. However, for the shielding braiding formed by performing braiding process, when the number of cycles exceeds 100,000 times, a remarkable resistance increase is confirmed because the copper foil is broken due to rubbing between adjacent copper foil threads. For this reason, it is impossible to secure the number of cycles (the number of flexing times) to be one million times.

As shown in FIG. 2, since the elastic region of the braiding that is formed by braiding tin-plated annealed copper wire is narrow, the braiding is plastically deformed every time the braiding is bent, and from the cycle number of about 10,000 times, sharpness begins to occur in the tin-plated annealed copper wire, and a remarkable resistance increase is confirmed.

On the other hand, for the braiding which is formed by braiding plated fiber, a remarkable resistance increase is not confirmed even when the number of cycles exceeds 2.5 million.

From the results shown in FIG. 2 and FIG. 3, it is found that the braiding which is formed by braiding plated fiber has a better flex resistance than the tin-plated annealed copper wire or a braiding which is formed by braiding copper foil threads.

Next, the shielding performances of an embodiment of the flex-resistant shielded composite cable according to the present embodiment (embodiment 2) and comparative examples of shielded cables (comparative examples 3 and 4) will be described.

First, in the embodiment 2, a polyarylate fiber is used as an anti-tension fiber, and copper plating is applied to the polyarylate fiber at a thickness of 0.024 mm to obtain a plated fiber of a diameter of 0.0268 mm. A braiding formed by braiding the plated fiber at a holding number of 300 and at a striking number of 48 becomes the shielding layer. Three electric wires (nominal sectional area of the conductor part is 8 sq) which are twisted are used inside the shielding layer. An ethylene copolymer having a thickness of 1 mm is used for the sheath.

In the comparative example 3, a tin-plated annealed copper wire having a diameter of 0.12 mm is formed by tin plating an annealed copper wire at a thickness of 0.1 μm. A braiding formed by braiding the tin-plated annealed copper wire at a holding number of 8 and at a striking number of 12 becomes the shielding layer. A single wire (nominal sectional area of the conductor part is 8 sq) is used inside the shielding layer. That is, a single core shielded cable is used. An ethylene copolymer having a thickness of 1 mm is used for the sheath.

In the comparative example 4, a polyarylate fiber is used as an anti-tension fiber, and copper plating is applied to the polyarylate fiber at a thickness of 0.024 mm to obtain a plated fiber of a diameter of 0.0268 mm. A braiding formed by braiding the plated fiber at a holding number of 80 and at a striking number of 12 becomes the shielding layer. A single wire (nominal sectional area of the conductor part is 8 sq) is used inside the shielding layer. That is, a single core shielded cable is used. An ethylene copolymer having a thickness of 1 mm is used for the sheath.

Figure 4:
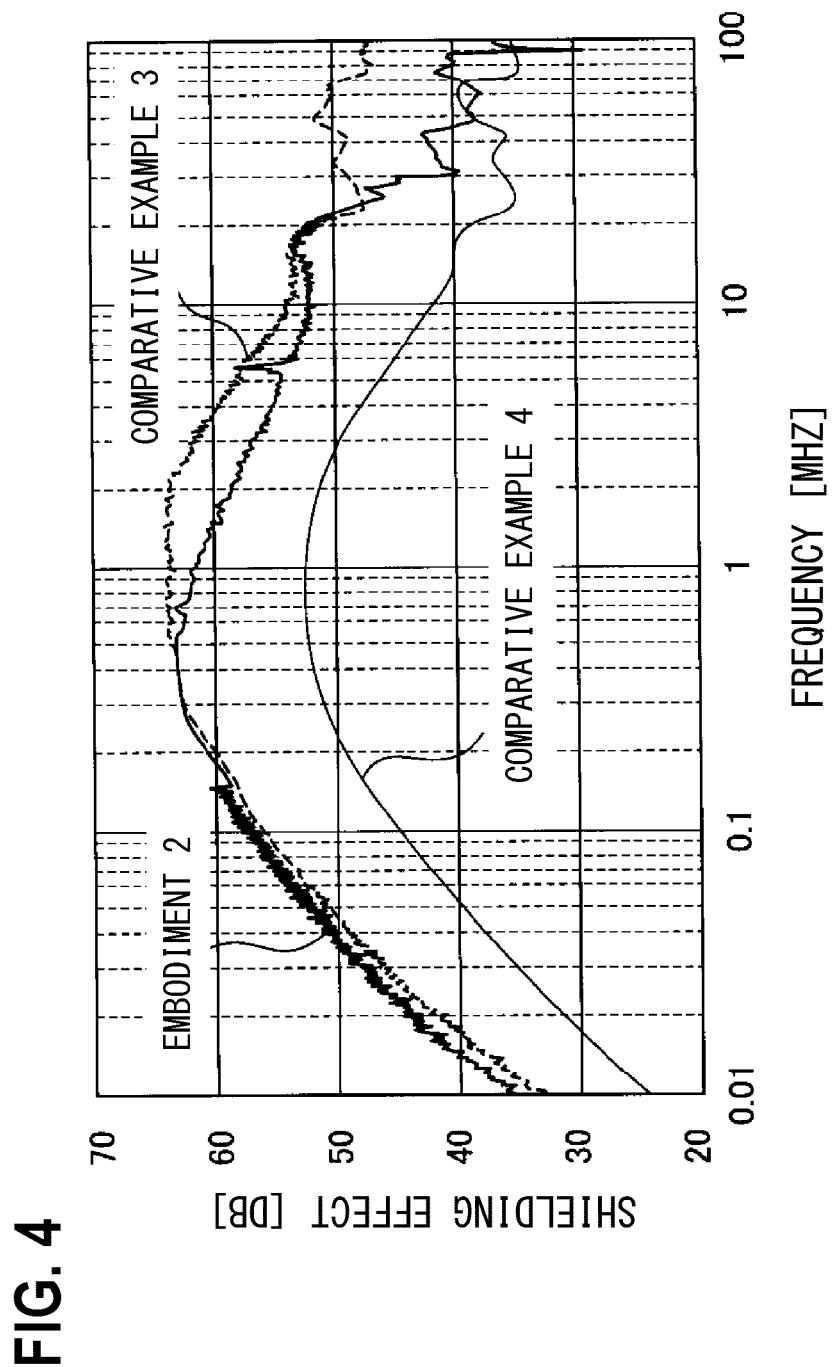
FIG. 4 is a graph showing shielding performance.

FIG. 4 is a graph showing shielding performance. As shown in FIG. 4, a comparative example 3 and a comparative example 4 are shielded cables of the same single core except that the shielding layer is different. When the shielding performances of the comparative example 3 and the comparative example 4 are compared, in the comparative example 4, since the plated fiber is used for the shielding layer, the metal portion is smaller than the comparative example, and the shielding performance is deteriorated. In particular, the braiding resistance of the shielding layer according to the comparative example 3 is increased to 46.7 mΩ/m, whereas the braiding resistance of the shielding layer according to the comparative example 3 is 9.7 mΩ/m.

On the other hand, in the embodiment 2, since a plurality of electric wires (electric wire having a constant thickness, or the conductor part of the electric wire has a nominal sectional area of 8 sq) are provided inside the shielding layer, the diameter of the shielding layer inevitably increases. Thus, metal material around the plurality of electric wires also increases, and the same shielding performance as the comparative example 3 is secured. In particular, the braiding resistance of the shielding layer according to the embodiment 2 is 6.95 mΩ/m.

Next, flex resistances of flex-resistant shielded composite cables according to other embodiments (embodiments 3 to 5) will be described.

First, in the embodiments 3 to 5, the flex-resistant shielded composite cables have three electric wires (the nominal sectional area of the conductor part is 8 sq) in the shielding layer, and the shielding layer and the sheath are the same as those in the embodiment 2. In the embodiment 3, three electric wires are twisted together at a twist pitch that is 18 times the layer center diameter (the diameter of a circle passing the centers of the three electric wires). In the embodiment 4, three electric wires are not twisted, and in the embodiment 5, three electric wires are twisted together at a twist pitch of 20 times the layer core diameter.

For the flex-resistant shielded composite cables according to the embodiments 3 to 5, the length (cable length) from a fixed part to the distal end of the cable is 300 mm, and the distal ends of the three electric wires are attached to a three-pole connector (three terminal accommodating rooms side by side) through predetermined terminals. In addition, flexing to be applied when attaching to the in-wheel motor is assumed, and a twisting and bending operation is applied to the 3 pole connector 2,500,000 times back and forth. The rotation axis of the twisting and bending is the center of the three pole connector in the plane direction in which the three terminal accommodating rooms are arranged, and the twisting and bending is set to 40 degree in the counterclockwise direction and 90 degree in the clockwise direction.

After such 2,500,000 times of twisting and bending, for the flex-resistant shielded composite cable according to the embodiment 4, the electric wire connected to the central terminal accommodating room of the three-pole connector is completely disconnected. This is because the electric wire connected to the central terminal accommodating room among the three electric wires are shorter in electric wire length than the electric wires connected to the terminal accommodating rooms at ends, and it is thought that strong tension is given to only one electric wire for the twisting and bending.

On the other hand, for the flex-resistant shielded composite cables according to the embodiment 3 and the embodiment 5, since the three electric wires are twisted, the pulling tension is made uniform, and the tension is difficult to be applied to only one electric wire as described above. For this reason, for the flex-resistant shielded composite cable according to the embodiment 3 and the embodiment 5, complete breakage did not occur.

In addition, when comparing the flex-resistant shielded composite cables according to the embodiment 3 and the embodiment 5, no strand breakage occurs for the flex-resistant shielded composite cable according to the embodiment 3, and the strand breakage somewhat occurs for the flex-resistant shielded composite cable according to the embodiment 5. This is judged to be due to the difference in twist pitch.

This point will be described below. First, to make the pulling tension uniform, it is preferable that a wire length increment a by twisting processing (increment in the length of the wire compared to the case without twisting processing) exceeds an electric wire bundle length decrement b at the time of maximum twisting and bending of the connector (90 degree twisting and bending) (when a plurality of twisted electric wires are most twisted, since the electric wire length is unchanged, the electric wire bundle becomes shorter than the length at the time of twisting process by the twisted. parts). Therefore, it is preferable that the electric wire length increment a>the electric wire bundle length decrement b.

In the embodiment 5, the twist pitch is 20 times the layer core diameter (135 mm), and a−b=4.5 mm. On the other hand, in the embodiment 3 the twist pitch is 18 times the layer core diameter (120 mm), a−b=5.5 mm. From this result, it is found that disconnection does not occur even if a−b≥5.5 mm, and even if flexing of up to 90 degree is given 2.5 million times. In the embodiments 3 to 5, because the cable length is set to 300 mm, a−b≥5.5 mm. However, for a cable length beyond 300 mm, it is preferred. that the twist pitch is set to 18 times or less the layer core diameter.

Thus, according to the flex-resistant shielded composite cable 1 of the present embodiment, since the strand diameter of the conductor parts 11a to 13a is set to 0.05 mm or more, the strands do not become excessively thin and is difficult to be easily disconnected, and since the strand diameter of the conductor parts 11a to 13a is set to 0.12 mm or less, the strand has a preferable flexibility. Since the conductor parts 11a to 13a have a nominal cross sectional area of 8 sq or more, the shielding layer 20 on the outer peripheral side is made to be somewhat larger. Further, since the shielding layer 20 is composed of a braiding formed by braiding plated fiber which are formed by performing metal-plating on anti-tension fiber, the shielding layer 20 has a higher strength and a wider elastic region and has appropriate flex resistance, and shielding performance can also be secured by metal plating. As described above, it is possible to provide the flex-resistant shielded composite cable 1 having the plurality of electric wires 11-13 housed in the sheath 30 and having flex resistance and shielding performance.

If the three electric wires 11 to 13 are not twisted, when the three electric wires 11 to 13 are connected to a movable part, the length of the electric wire located at the center side becomes shorter among the three or more electric wires, and the pulling tension by driving acts more on the electric wire located at the center side than the electric wires at the end side excluding the center side. As a result, the possibility of disconnection increases, but by twisting process to make the pulling tension uniform, even if the electric wires are connected to the movable part, it is possible to prevent the situation that only a part of the electric wire is easily disconnected.

In addition, since the three electric wires 11 to 13 are twisted at a twist pitch of 18 times or less the layer core diameter, the relationship of the electric wire length increment a by the twisting process with the electric wire bundle length decrement b in the case the twisted electric wires are most twisted, (when the twisting operation is performed at the largest angle) is optimized, so that it is possible to further prevent the situation that only a part of the electric wires are easily disconnected.

Further, according to the wheel wiring wire harness WH of the present embodiment, since the flex-resistant shielded composite cable 1 and the another electric wire OW arranged along the flex-resistant shielded composite cable 1 are included, it is possible to suppress noise interference to other electric wires OW, for example, when the motor for driving wheels is driven by electric power from the inverter.

Next, a second embodiment of the present invention will be described. A wheel wiring wire harness WH according to the second embodiment is the same as the wire harness WH in the first embodiment but parts of the configuration are different. The differences from the first embodiment will be described below.

Figure 5:
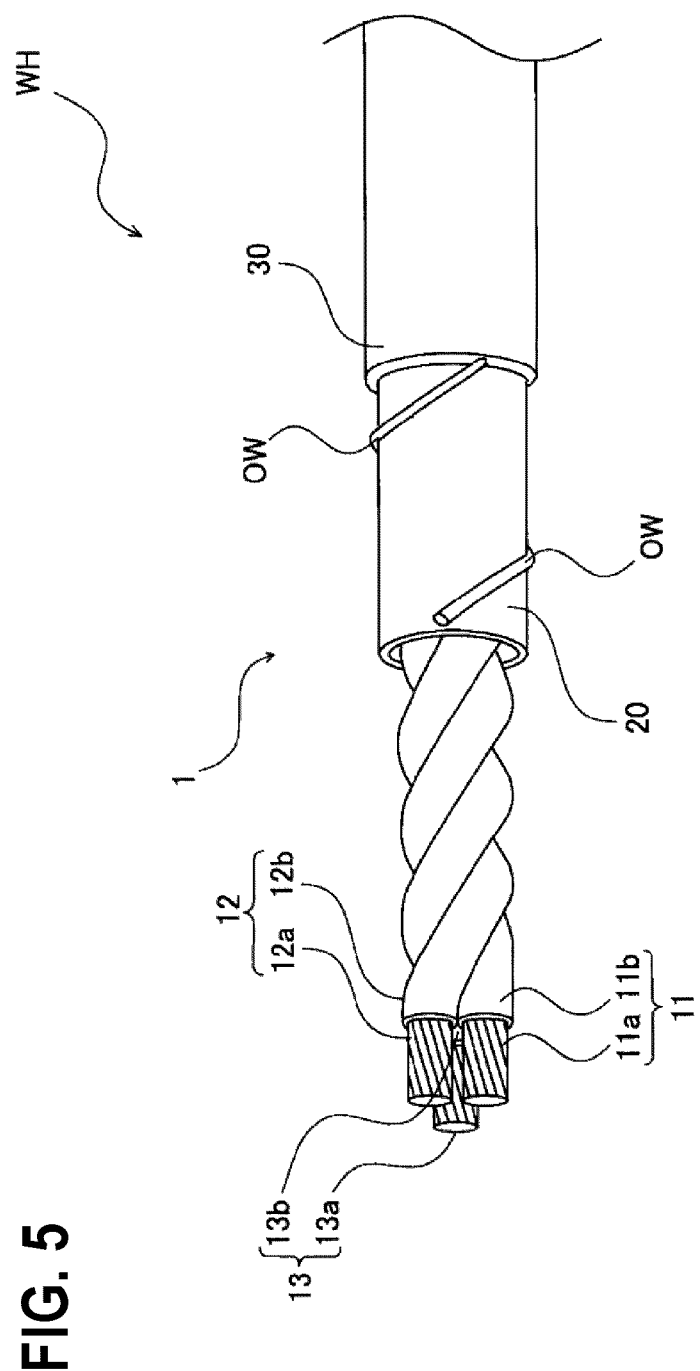
FIG. 5 shows a wire harness connected to wheel including a flex-resistant shielded composite cable according to a second embodiment.

FIG. 5 shows the wheel wiring wire harness including a flex-resistant shielded composite cable according to the second embodiment. As shown in FIG. 5, the wheel wiring wire harness WH according to the second embodiment includes a flex-resistant shielded composite cable 1 and another electric wire OW.

In the second embodiment, another electric wire OW is arranged between a shielding layer 20 and a sheath 30. Therefore, the wheel wiring wire harness WH according to the second embodiment does not include the exterior part EP. In particular, the another electric wire OW according to the second embodiment is arranged in a spiral shape in the longitudinal direction of the flex-resistant shielded composite cable 1.

Here, another electric wire OW may be disposed in the gap between the shielding layer 20 and the sheath 30. However, by integrating another electric wire OW at the time of molding the sheath 30, a part of the another electric wire OW or all of them may be buried in the sheath 30. This is because it is possible to suppress abnormal noises due to vibration of the another electric wire OW caused by vehicle vibration.

In this way, the flex-resistant shielded composite cable 1 according to the second embodiment accommodates a plurality of electric wires in the sheath, like the first embodiment, and it is possible to provide a flex-resistant shielded composite cable having flex resistance and shielding performance. In addition, it is possible to further prevent the situation that only a part of the electric wire is easily disconnected.

The wheel wiring wire harness WH according to the second embodiment, like the first embodiment, can suppress noise interference to another electric wire OW.

Furthermore, according to the wheel wiring wire harness WH of the second embodiment, since the another electric wire OW is spirally arranged between the shielding layer 20 and the sheath 30 in the longitudinal direction of the flex-resistant shielded composite cable 1, the difference in the line length occurring inside and outside the flexing when the cable is flexed can be absorbed, and thus it is possible to eliminate a concern that disconnection of the another electric wire occurs earlier than the plurality of electric wires.

Although the present invention has been described based on the embodiments above, the present invention is not limited to the above-described embodiments, and without departing from the spirit of the present invention, modifications may be made and well-known and known techniques may be combined.

For example, in the above embodiment, the flex-resistant shielded composite cable 1 is provided with three electric wires 11 to 13, but the present invention is not limited this, and two or four or more electric wires may be provided. Particularly, in the above description, since it is assumed that an inverter is provided at the vehicle body side, the flex-resistant shielded composite cable 1 has three electric wires 11 to 13, but if an inverter is provided at the wheel side, the number of electric wires may be 2. For the twisting process and the twisting pitch described above, even when four or more electric wires are provided, the same effect can be obtained.

What is claimed is:

1. A flex-resistant shielded composite cable comprising:
a plurality of electric wires each of which includes:
a conductor part which is composed of a twisted wire, which is formed by twisting a plurality of strands having a diameter of 0.05 mm or more and 0.12 mm or less, a nominal sectional area of the conductor part being 8 sq or more;
a covering part covering the conductor part;
a shielding layer that is formed of a braid formed by braiding plated fiber formed by performing metal-plating on anti-tension fiber and covers outer periphery of the plurality of electric wires; and
a tubular sheath that is provided on the outer periphery of the shielding layer and made of an insulating resin.

2. The flex-resistant shielded composite cable according to claim 1, wherein the plurality of electric wires are three or more electric wires and twisted.

3. The flex-resistant shielded composite cable according to claim 2, wherein the three or more electric wires are twisted at a twist pitch of 18 times or less a layer core diameter which is the diameter of a circle passing the centers of the three or more electric wires.

4. A wire harness comprising:
a flex-resistant shielded composite cable according to claim 1, one end of which is connected to a motor for driving wheels provided at a wheel side; and
a second electric wire disposed along the flex-resistant shielded composite cable between the shielding layer of the flex-resistant shielded composite cable and the tubular sheath or outside the tubular sheath.

5. The wire harness according to claim 4, wherein the second electric wire is arranged between the shielding layer and the tubular sheath in a spiral shape in a longitudinal direction of the flex-resistant shielded composite cable.

\* \* \* \* \*